(12) United States Patent
Jablonski

(10) Patent No.: US 11,624,455 B2
(45) Date of Patent: Apr. 11, 2023

(54) VALVE TRIM

(71) Applicant: FISHER CONTROLS INTERNATIONAL LLC, Marshalltown, IA (US)

(72) Inventor: Jason D. Jablonski, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 71 days.

(21) Appl. No.: 17/097,551

(22) Filed: Nov. 13, 2020

(65) Prior Publication Data

US 2022/0154849 A1    May 19, 2022

(51) Int. Cl.
F16K 47/00 (2006.01)
F16K 47/08 (2006.01)
F16K 47/04 (2006.01)
F16K 1/32 (2006.01)
F16K 5/06 (2006.01)
F16K 1/22 (2006.01)

(52) U.S. Cl.
CPC ............... *F16K 47/00* (2013.01); *F16K 1/22* (2013.01); *F16K 1/32* (2013.01); *F16K 5/0605* (2013.01); *F16K 47/045* (2013.01); *F16K 47/08* (2013.01)

(58) Field of Classification Search
CPC .......... F16K 47/045; F16K 47/00; F16K 1/22; F16K 1/32; F16K 5/0605; F16K 47/08
See application file for complete search history.

(56) References Cited

U.S. PATENT DOCUMENTS

| 514,338 A | * | 2/1894 | Row ...................... F28F 1/022 165/177 |
| 3,908,698 A | * | 9/1975 | Baumann ................ F16K 47/04 137/625.3 |
| 3,954,124 A | * | 5/1976 | Self .......................... F16K 3/34 138/40 |
| 3,978,891 A | * | 9/1976 | Vick ........................ F16K 3/34 137/625.3 |
| 4,007,908 A | * | 2/1977 | Smagghe .......... F16L 55/02709 138/40 |
| 4,127,146 A | * | 11/1978 | Self ................... F16L 55/02781 137/625.37 |
| 4,258,750 A | * | 3/1981 | Schnall ................ F16K 47/045 137/625.37 |
| 5,307,830 A | * | 5/1994 | Welker .................... F16K 47/08 251/118 |

(Continued)

OTHER PUBLICATIONS

Product Bulletin, "Fisher Vee-Ball V150, V200 and V300 Rotary Control Valves" dated Mar. 2020.

(Continued)

*Primary Examiner* — Matthew W Jellett
*Assistant Examiner* — Christopher D Ballman
(74) *Attorney, Agent, or Firm* — Marshall, Gerstein & Borun LLP

(57) ABSTRACT

A valve trim includes a body having a plurality of parallel flow passages extending from a first end of the body to a second end of the body, opposite the first end. Each flow passage includes a throat and an expansion chamber and each throat is nested between the expansion chambers of directly adjacent flow passages.

18 Claims, 10 Drawing Sheets

(56) References Cited

U.S. PATENT DOCUMENTS

| | | | | |
|---|---|---|---|---|
| 5,327,941 A * | 7/1994 | Bitsakis | ............... | F15D 1/02 |
| | | | | 138/44 |
| 5,419,371 A * | 5/1995 | Berchem | ............... | F16K 47/08 |
| | | | | 138/40 |
| 5,730,416 A * | 3/1998 | Welker | ............... | F16K 47/08 |
| | | | | 251/118 |
| 6,095,196 A * | 8/2000 | McCarty | ............... | F16K 47/08 |
| | | | | 138/40 |
| 6,217,208 B1 * | 4/2001 | Schuchardt | ............... | F28F 1/045 |
| | | | | 366/147 |
| 6,244,297 B1 * | 6/2001 | Baumann | ............... | F16K 47/08 |
| | | | | 137/625.3 |
| 6,394,134 B1 * | 5/2002 | Kwon | ............... | F16K 47/08 |
| | | | | 137/625.33 |
| 6,637,452 B1 * | 10/2003 | Alman | ............... | F16K 3/243 |
| | | | | 251/324 |
| 7,117,827 B1 * | 10/2006 | Hinderks | ............... | F02B 75/00 |
| | | | | 123/197.1 |
| 7,178,782 B1 * | 2/2007 | York | ............... | F16K 5/12 |
| | | | | 137/625.3 |
| 7,845,688 B2 * | 12/2010 | Gallagher | ............... | F16L 39/00 |
| | | | | 138/44 |
| 8,511,889 B2 * | 8/2013 | Choikhet | ............... | G01N 30/34 |
| | | | | 138/40 |
| 9,291,282 B2 * | 3/2016 | Fagerlund | ............... | F16K 47/08 |
| 9,528,632 B2 * | 12/2016 | Glaun | ............... | F16K 47/04 |
| 10,302,224 B2 * | 5/2019 | Kluz | ............... | F16K 47/08 |
| 10,605,370 B2 * | 3/2020 | Hammond | ............... | F16K 21/02 |
| 10,794,794 B2 * | 10/2020 | Bowdle | ............... | G01M 9/065 |
| 10,900,591 B2 * | 1/2021 | Gabriel | ............... | B33Y 80/00 |
| 10,989,234 B2 * | 4/2021 | Jouenne | ............... | F16K 3/03 |
| 11,209,100 B2 * | 12/2021 | Bell | ............... | F16K 47/08 |
| 2016/0178067 A1 * | 6/2016 | Abouelleil | ............... | F16K 1/22 |
| | | | | 251/308 |
| 2017/0159521 A1 * | 6/2017 | Kobayashi | ............... | F01N 3/022 |
| 2017/0234440 A1 * | 8/2017 | Detmers | ............... | F16K 3/34 |
| | | | | 251/118 |
| 2018/0106383 A1 * | 4/2018 | Kuhlman | ............... | F16K 47/08 |
| 2020/0072383 A1 * | 3/2020 | Gabriel | ............... | F16K 47/04 |

OTHER PUBLICATIONS

Instruction Manual, "Fisher Vee-Ball V150, V200, and V300 Rotary Control Valves NPS 1 through 12" dated Jul. 2020.

* cited by examiner

VALVE TRIM

FIELD OF THE DISCLOSURE

This disclosure relates generally to valve trim for control valves and, more particularly, to valve trim used for cavitation control and noise reduction.

BACKGROUND

In typical control valves, cavitation and resultant noise and vibration from cavitation are created when a liquid flowing through the control valve undergoes a high pressure drop. Cavitation occurs when fluid vaporizes and then returns to a liquid state, such as when a fluid passes through a restriction, such as a between a valve plug/disc and valve seat. The fluid can reach its vapor point due to decrease in pressure and increase in velocity at the restriction. Cavitation causes noise and vibration, which can damage the control valve. This phenomenon is especially likely in ball and butterfly valves where the pressure drop occurs in only one stage.

In some control valves, a valve trim has been used to condition the flow of fluid through the control valve and to attempt to reduce noise, cavitation, and turbulence through the control valve. For example, there have been valve trims that consist of multiple cylindrical tubes welded together and positioned directly after the valve plug or valve disc of the control valve. However, the cross sections of the flow passages of these valve trims are relatively homogenous with all of the tubes or cells having a consistent and comparable size and shape, which do not provide any pressure drop chambers to assist in the cavitation and noise reduction.

Multi-stage cavitation control and noise reduction valve trims have also been used where identical flow passages having one or more expansion chambers are formed adjacent each other through the valve trim. However, the size of adjacent expansion chambers requires the flow passages to be spaced apart and limits the flow volume through valve trim.

Therefore, there is a need for a valve trim for control valves that provides flow passages that each have one or more expansion chambers to reduce cavitation and the noise and vibration caused by cavitation, while still maximizing the flow volume through the valve trim.

BRIEF SUMMARY OF THE DISCLOSURE

In accordance with one exemplary aspect of the present invention, a valve trim comprises a body having a plurality of parallel flow passages extending from a first end of the body to a second end of the body, opposite the first end. Each flow passage includes a throat and an expansion chamber and each throat is nested between the expansion chambers of directly adjacent flow passages.

In further accordance with any one or more of the foregoing exemplary aspects of the present invention, a valve trim may further include, in any combination, any one or more of the following preferred forms.

In one preferred form, each expansion chamber is offset in a direction of flow from the expansion chambers of directly adjacent flow passages such that each expansion chamber is directly adjacent the throats of directly adjacent flow passages in a direction perpendicular to the direction of flow.

In another preferred form, the body is a single, unitary piece.

In another preferred form, each throat has a constant square cross-sectional shape and each expansion chamber has a first section having a constant octagonal cross-sectional shape.

In another preferred form, each expansion chamber has a second section having the octagonal cross-sectional shape of the first section at a first end of the second section and tapers to the square cross-sectional shape of the throat at a second end of the second section.

In another preferred form, each throat has four sides, each having a first length and each first section of each expansion chamber includes four sides that are parallel to each of the sides of the respective throat and have a second length that is the same the first length.

In accordance with another exemplary aspect of the present invention, a ball valve comprises a valve body having an inlet and an outlet and a valve plug positioned within the valve body and rotatable between an open position and a closed position. A valve trim is positioned within the valve plug and rotates with the valve plug. The valve trim comprises a body having a plurality of parallel flow passages extending from a first end of the body to a second end of the body, opposite the first end. Each flow passage includes a throat and an expansion chamber and each throat is nested between the expansion chambers of directly adjacent flow passages.

In accordance with another exemplary aspect of the present invention, a ball valve comprises a valve body having an inlet and an outlet and a valve plug positioned within the valve body and rotatable between an open position and a closed position. A valve trim has a first section positioned in the outlet and a second section that extends from the first section and into the valve plug. The valve trim comprises a body having a plurality of parallel flow passages extending from a first end of the body to a second end of the body, opposite the first end. Each flow passage includes a throat and an expansion chamber and each throat is nested between the expansion chambers of directly adjacent flow passages.

In accordance with another exemplary aspect of the present invention, a butterfly valve comprises a valve body having an inlet and an outlet and a valve disc positioned within the valve body and rotatable between a closed position, in which the valve disc engages a valve seat and prevents fluid flow between the inlet and the outlet, and an opened position, in which the valve disc is spaced apart from the valve seat and allows fluid flow between the inlet and the outlet. A valve trim is positioned within the outlet, downstream from the valve disc. The valve trim comprises a body having a plurality of parallel flow passages extending from a first end of the body to a second end of the body, opposite the first end. Each flow passage includes a throat and an expansion chamber and each throat is nested between the expansion chambers of directly adjacent flow passages.

In further accordance with any one or more of the foregoing exemplary aspects of the present invention, a butterfly valve may further include, in any combination, any one or more of the following preferred forms.

In one preferred form, the first end of the valve trim has a concave, arcuate shape that corresponds to the outer surface of the valve disc.

In accordance with another exemplary aspect of the present invention, a valve trim comprises a body having a plurality of parallel flow passages extending from a first end of the body to a second end of the body, opposite the first end. Each flow passage includes a throat and an expansion chamber and each throat has a constant square cross-sectional shape and each expansion chamber has a first section having a constant octagonal cross-sectional shape.

In further accordance with any one or more of the foregoing exemplary aspects of the present invention, a valve trim may further include, in any combination, any one or more of the following preferred forms.

In one preferred form, the body is a single, unitary piece.

In another preferred form, each expansion chamber has a second section having the octagonal cross-sectional shape of the first section at a first end of the second section and tapers to the square cross-sectional shape of the throat at a second end of the second section.

In another preferred form, each throat is nested between the expansion chambers of directly adjacent flow passages.

In another preferred form, each expansion chamber is offset in a direction of flow from the expansion chambers of directly adjacent flow passages such that each expansion chamber is directly adjacent the throats of directly adjacent flow passages in a direction perpendicular to the direction of flow.

In another preferred form, each throat has four sides, each having a first length and each first section of each expansion chamber includes four sides that are parallel to each of the sides of the respective throat and have a second length that is the same the first length.

In accordance with another exemplary aspect of the present invention, a ball valve comprises a valve body having an inlet and an outlet and a valve plug positioned within the valve body and rotatable between an open position and a closed position. A valve trim is positioned within the valve plug and rotates with the valve plug. The valve trim comprises a body having a plurality of parallel flow passages extending from a first end of the body to a second end of the body, opposite the first end. Each flow passage includes a throat and an expansion chamber and each throat has a constant square cross-sectional shape and each expansion chamber has a first section having a constant octagonal cross-sectional shape.

In accordance with another exemplary aspect of the present invention, a ball valve comprises a valve body having an inlet and an outlet and a valve plug positioned within the valve body and rotatable between an open position and a closed position. A valve trim has a first section positioned in the outlet and a second section that extends from the first section and into the valve plug. The valve trim comprises a body having a plurality of parallel flow passages extending from a first end of the body to a second end of the body, opposite the first end. Each flow passage includes a throat and an expansion chamber and each throat has a constant square cross-sectional shape and each expansion chamber has a first section having a constant octagonal cross-sectional shape.

In accordance with another exemplary aspect of the present invention, a butterfly valve comprises a valve body having an inlet and an outlet and a valve disc positioned within the valve body and rotatable between a closed position, in which the valve disc engages a valve seat and prevent fluid flow between the inlet and the outlet, and an opened position, in which the valve disc is spaced apart from the valve seat and allows fluid flow between the inlet and the outlet. A valve trim is positioned within the outlet, downstream from the valve disc. The valve trim comprises a body having a plurality of parallel flow passages extending from a first end of the body to a second end of the body, opposite the first end. Each flow passage includes a throat and an expansion chamber and each throat has a constant square cross-sectional shape and each expansion chamber has a first section having a constant octagonal cross-sectional shape.

In further accordance with any one or more of the foregoing exemplary aspects of the present invention, a butterfly valve may further include, in any combination, any one or more of the following preferred forms.

In one preferred form, the first end of the valve trim has a concave, arcuate shape that corresponds to the outer surface of the valve disc.

DETAILED DESCRIPTION

The example valve trims shown and described herein provide multi-stage cavitation control and noise reduction with stacked or nested flow passages that provide for maximized flow area through the valve trim. The valve trims having multiple flow passages, each having multiple converging nozzles and rapidly expanding pressure drop (expansion) chambers, and stack the multi-stage pressure drop chambers in adjacent flow passages as efficiently as possible, which allows the flow area through the valve trims to be maximized, giving the valve trims higher flow capacities, while still attenuating noise and cavitation.

In the example shown herein, to efficiently stack or nest the flow passages, each flow passage has pressure drop chambers that are octagonal in shape and that converge to throats having a square cross-section. The number of converging and expanding stages in the valve trims can be varied depending on the total pressure drop and flow required. The arrangement of octagon expansion chambers to square nozzles allows the flow passages to be nested with each other, with pressure drops being staggered along the axis of flow, thus maximizing flow area.

Figure 1:
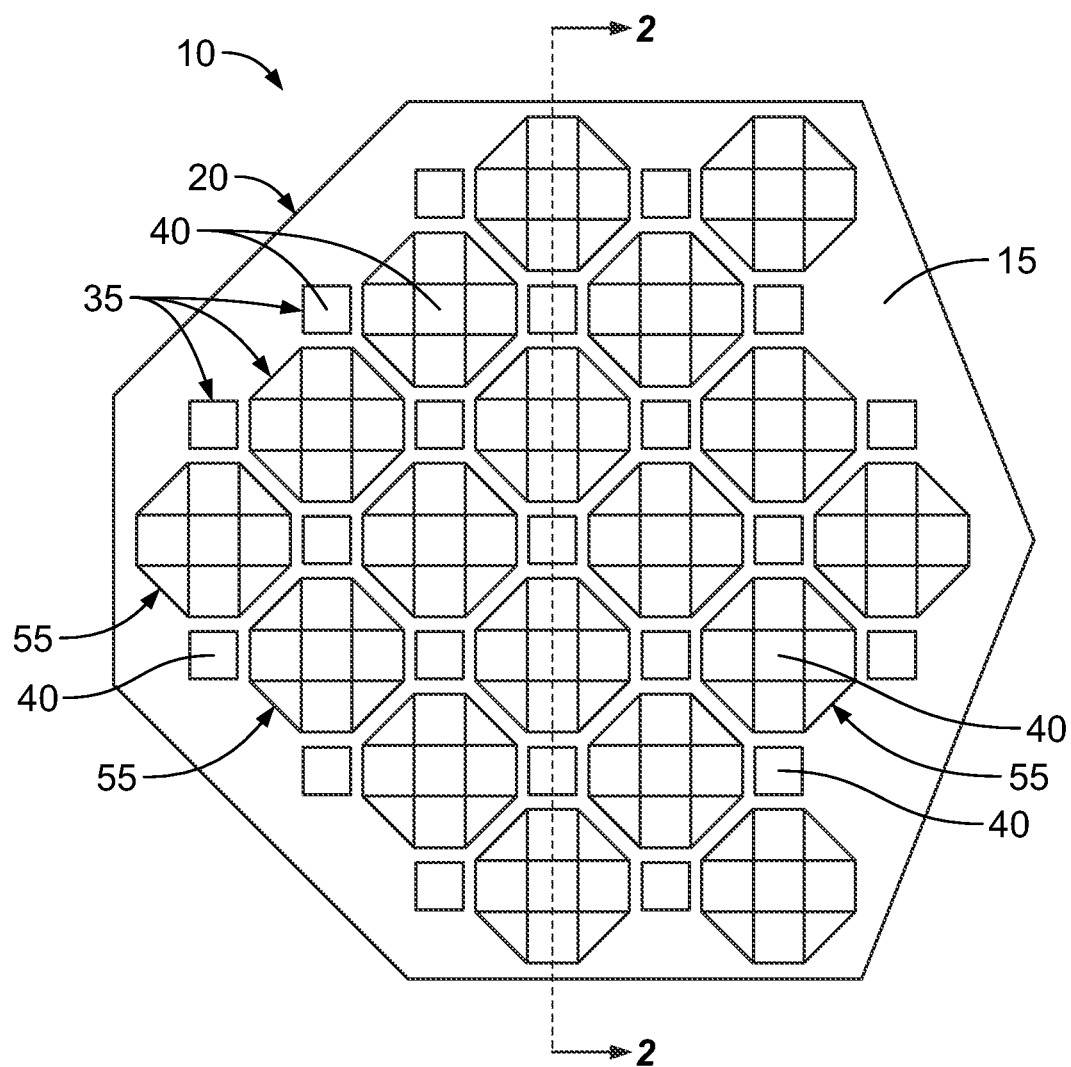
FIG. 1 is a front view of a first example valve trim.
Figure 2:
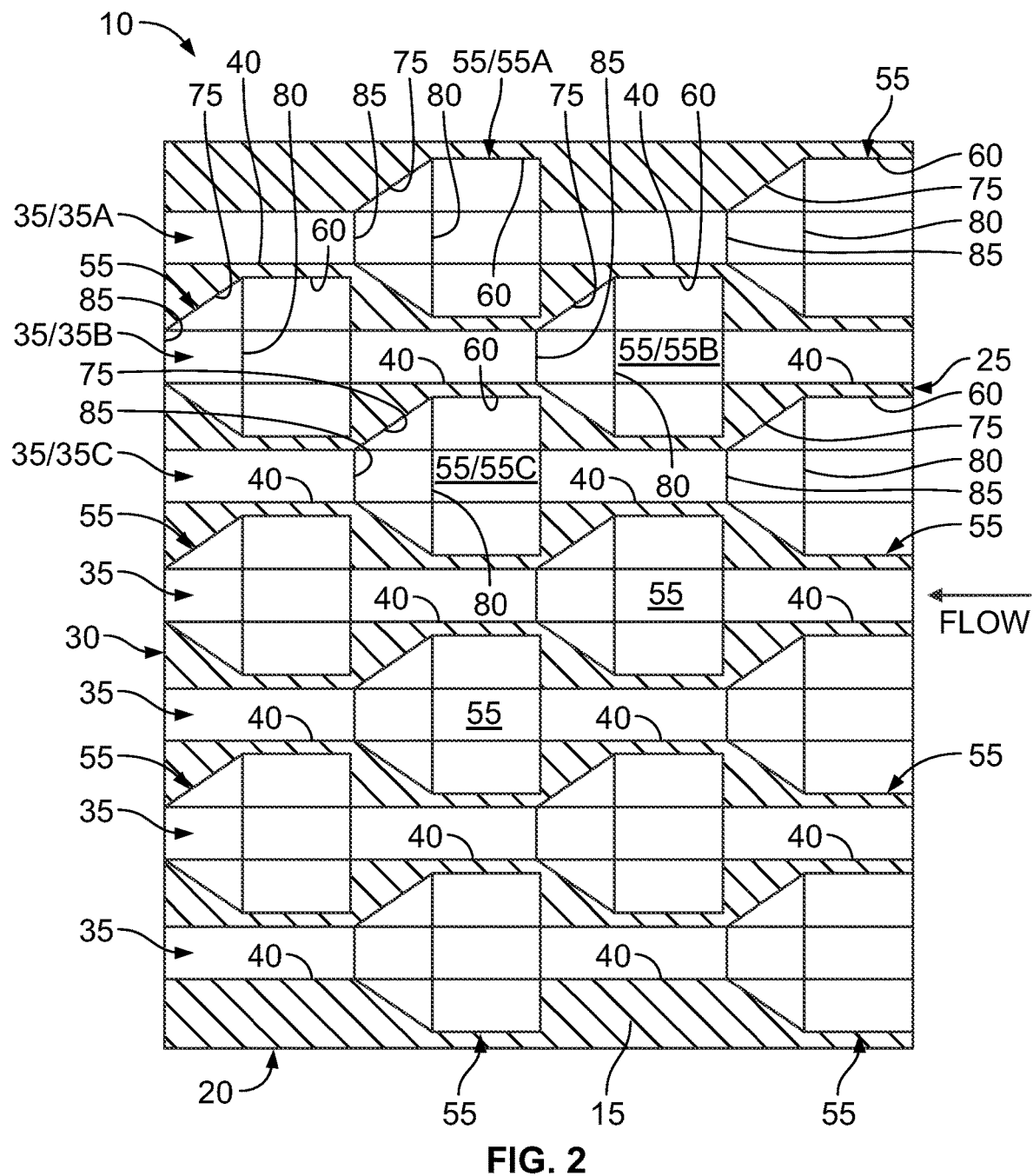
FIG. 2 is a cross-sectional view of the valve trim of FIG. 1 taken along line 2-2 in FIG. 1.

Referring to FIGS. 1-2, a first example valve trim 10 is shown, that can be used particularly with ball valves. Valve trim 10 has a body 15 with an outer peripheral shape 20 that allows valve trim 10 to be positioned within and secured to a valve plug of a ball valve. The outer peripheral shape 20 can vary depending on the type and design of the valve plug and ball valve. Body 15 of valve trim 10 is preferably a single, unitary piece and can be manufactured using Additive Manufacturing Technology, such as direct metal laser sintering, full melt powder bed fusion, etc. Using an Additive Manufacturing Technology process, the 3-dimensional design of body 15 is divided into multiple layers, for example layers approximately 20-50 microns thick. A powder bed, such as a powder based metal, is then laid down representing the first layer of the design and a laser or electron beam sinters together the design of the first layer. A second powder bed, representing the second layer of the design, is then laid down over the first sintered layer and the second layer is sintered together. This continues layer after layer to form the completed body 15. Using an Additive Manufacturing Technology process to manufacture valve trim for control valves allows the freedom to produce flow passages having various shapes, geometries, and features that are not possible using current standard casting or drilling techniques.

A plurality of flow passages 35 extend through body 15 from a first end 25 of body 15 to a second end 30, opposite first end 25, and can be used to characterize and/or condition fluid flowing through valve trim 10, for example, by reducing the pressure of the fluid as it flows through flow passages 35. Flow passages 35 are preferably parallel and each flow passage 35 includes at least one throat 40 and at least one expansion chamber 55 in fluid communication with throat 40. As can be seen in FIG. 2, in the example shown, each flow passage 35 includes two throats 40 and two expansion chambers 55, however, flow passages 35 can have as many alternating throats 40 and expansion chambers 55 as desired depending on the level of cavitation and noise reduction desired for a particular application. Each throat 40 has a square cross-sectional shape that is constant along the length of throat 40 in the direction of flow, shown by the arrow in FIG. 2. Each expansion chamber 55 has a first section 60 with an octagonal cross-sectional shape that is constant along the length of first section 60 in the direction of flow and a second section 75 that has the octagonal cross-sectional shape of first section 60 at a first end 80 and tapers to the square cross-sectional shape of throat 40 at a second end 85. Each expansion chamber 55 is offset in the direction of flow from the expansion chambers 55 of directly adjacent flow passages 35. For example, as shown in FIG. 2, the expansion chambers 55a of a first flow passage 35a are longitudinally offset in the direction of flow from the expansion chambers 55b of a second adjacent flow passage 35b, which are also longitudinally offset in the direction of flow from the expansion chambers 55C of a third adjacent flow passage 35c. The preferred square, octagonal, and tapered shapes of the throats 40 and expansion chambers 55 and the offset positioning of expansion chambers 55 of flow passages 35 allow expansion chambers 55 to be positioned directly adjacent the throats 40 of directly adjacent flow passages 35 in a direction perpendicular to the direction of flow and each throat 40 to be nested between expansion chambers 55 of directly adjacent flow passages 35. This staggering of expansion chambers 55, nesting of throats 40 between expansion chambers 55, and complimentary shapes of throats 40 and expansion chambers 55 allow a greater number of flow passages 35 to be formed through body 15 of valve trim 10, which maximizes the flow area through valve trim 10 while maintaining multi-stage cavitation control and noise reduction.

Figure 3:
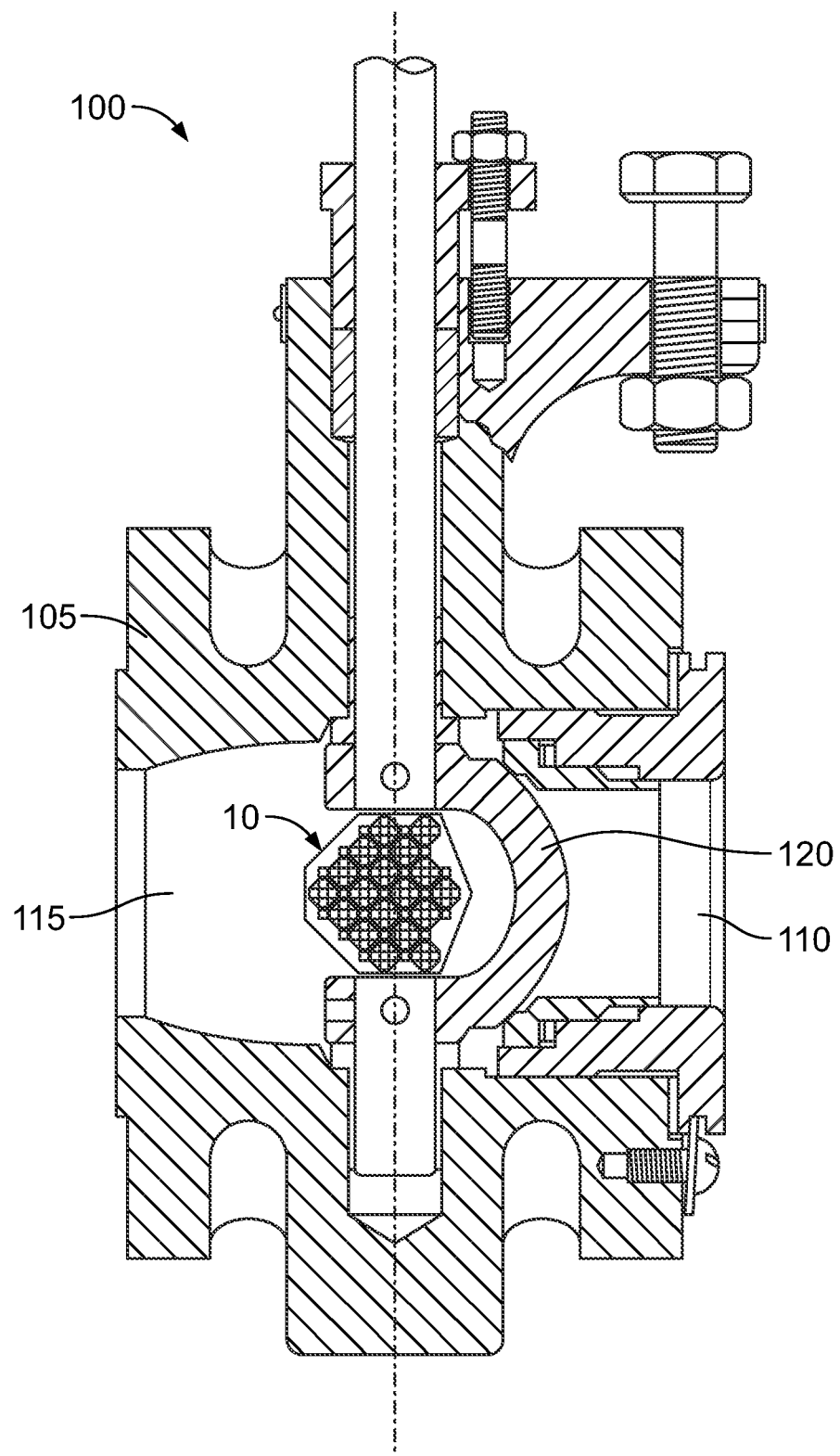
FIG. 3 is a cross-sectional view of an example ball valve with the valve trim of FIG. 1.

Referring to FIG. 3, an example ball valve 100 is shown that that includes valve trim 10. Ball valve 100 has a valve body 105 having an inlet 110 and an outlet 115. A valve plug 120 is positioned within valve body 105, between inlet 110 and outlet 115, and is rotatable within valve body 105 between an open position, in which valve plug 120 allows fluid flow between inlet 110 and outlet 115, and a closed position, in which valve plug 120 prevents fluid flow between inlet 110 and outlet 115. Valve trim 10 is positioned and secured within valve plug 120 such that valve trim 10 rotates with valve plug 120.

Figure 4:
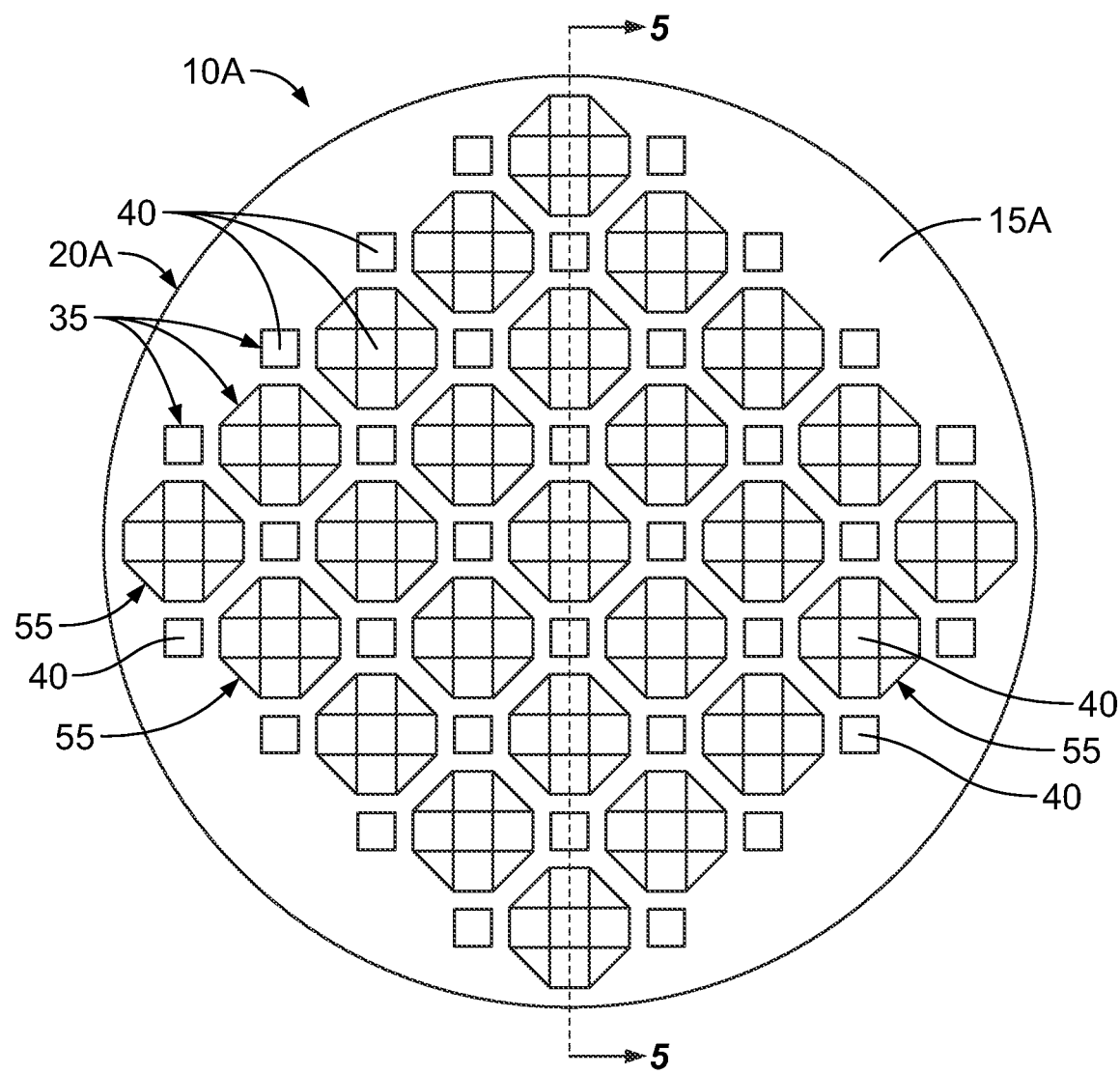
FIG. 4 is a front view of a second example valve trim.
Figure 5:
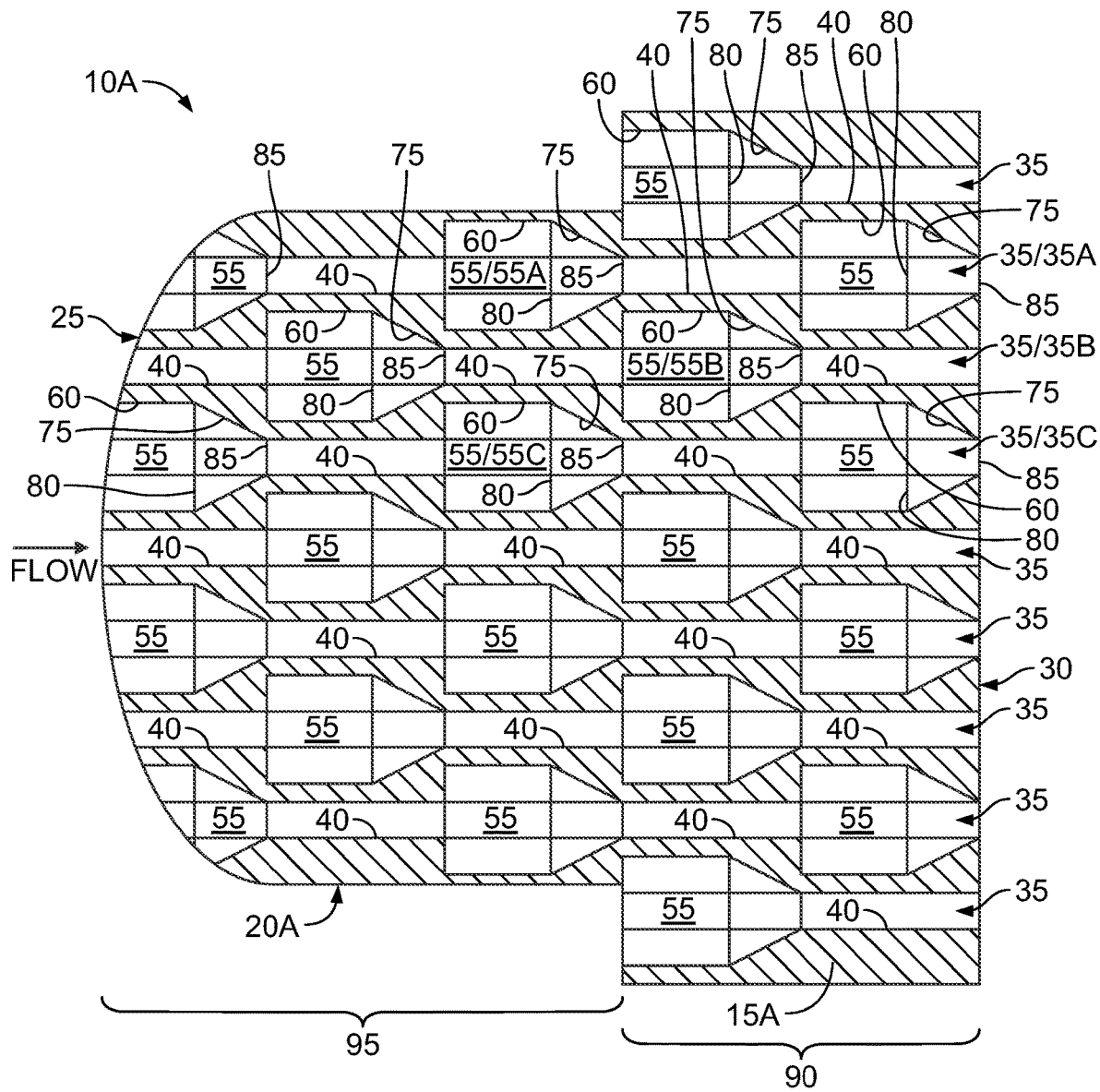
FIG. 5 is a cross-sectional view of the valve trim of FIG. 4 taken along line 5-5 in FIG. 4.

Referring to FIGS. 4-5, a second example valve trim 10A is shown, that can be used particularly with ball valves. Valve trim 10A is the same as valve trim 10 described above, except that body 15A of valve trim 10A has an outer peripheral shape 20A that allows valve trim 10A to be positioned and secured within an outlet of a ball valve and extend into the valve plug of the ball valve. In this example, body 15A of valve trim 10A has a first section 90 that is preferably cylindrical and configured to be positioned in the outlet of a ball valve and a second section 95 that extends from first section 90 and into the valve plug. As with valve trim 10, body 15A of valve trim 10A is preferably a single, unitary piece and can be manufactured using Additive Manufacturing Technology, such as direct metal laser sintering, full melt powder bed fusion, etc.

As with valve trim 10, flow passages 35 extend through body 15A of valve trim 10A from a first end 25 of body 15A to a second end 30, opposite first end 25, and can be used to characterize and/or condition fluid flowing through valve trim 10A, for example, by reducing the pressure of the fluid as it flows through flow passages 35. Flow passages 35 are preferably parallel and each flow passage 35 includes at least one throat 40 and at least one expansion chamber 55 in fluid communication with throat 40. As can be seen in FIG. 5, in the example shown, each flow passage 35 can include any number of alternating throats 40 and expansion chambers 55, depending on the position of each flow passage 35 in valve trim 10A. Each throat 40 has a square cross-sectional shape that is constant along the length of throat 40 in the direction of flow, shown by the arrow in FIG. 5. Each expansion chamber 55 has a first section 60 with an octagonal cross-sectional shape that is constant along the length of first section 60 in the direction of flow and a second section 75 that has the octagonal cross-sectional shape of first section 60 at a first end 80 and tapers to the square cross-sectional shape of throat 40 at a second end 85. Each expansion chamber 55 is offset in the direction of flow from the expansion chambers 55 of directly adjacent flow passages 35, as described above. The preferred square, octagonal, and tapered shapes of the throats 40 and expansion chambers 55 and the offset positioning of expansion chambers 55 of flow passages 35 allow expansion chambers 55 to be positioned directly adjacent the throats 40 of directly adjacent flow passages 35 in a direction perpendicular to the direction of flow and each throat 40 to be nested between expansion chambers 55 of directly adjacent flow passages 35. This staggering of expansion chambers 55, nesting of throats 40 between expansion chambers 55, and complimentary shapes of throats 40 and expansion chambers 55 allow a greater number of flow passages 35 to be formed through body 15A of valve trim 10A, which maximizes the flow area through valve trim 10A while maintaining multi-stage cavitation control and noise reduction.

Figure 6:
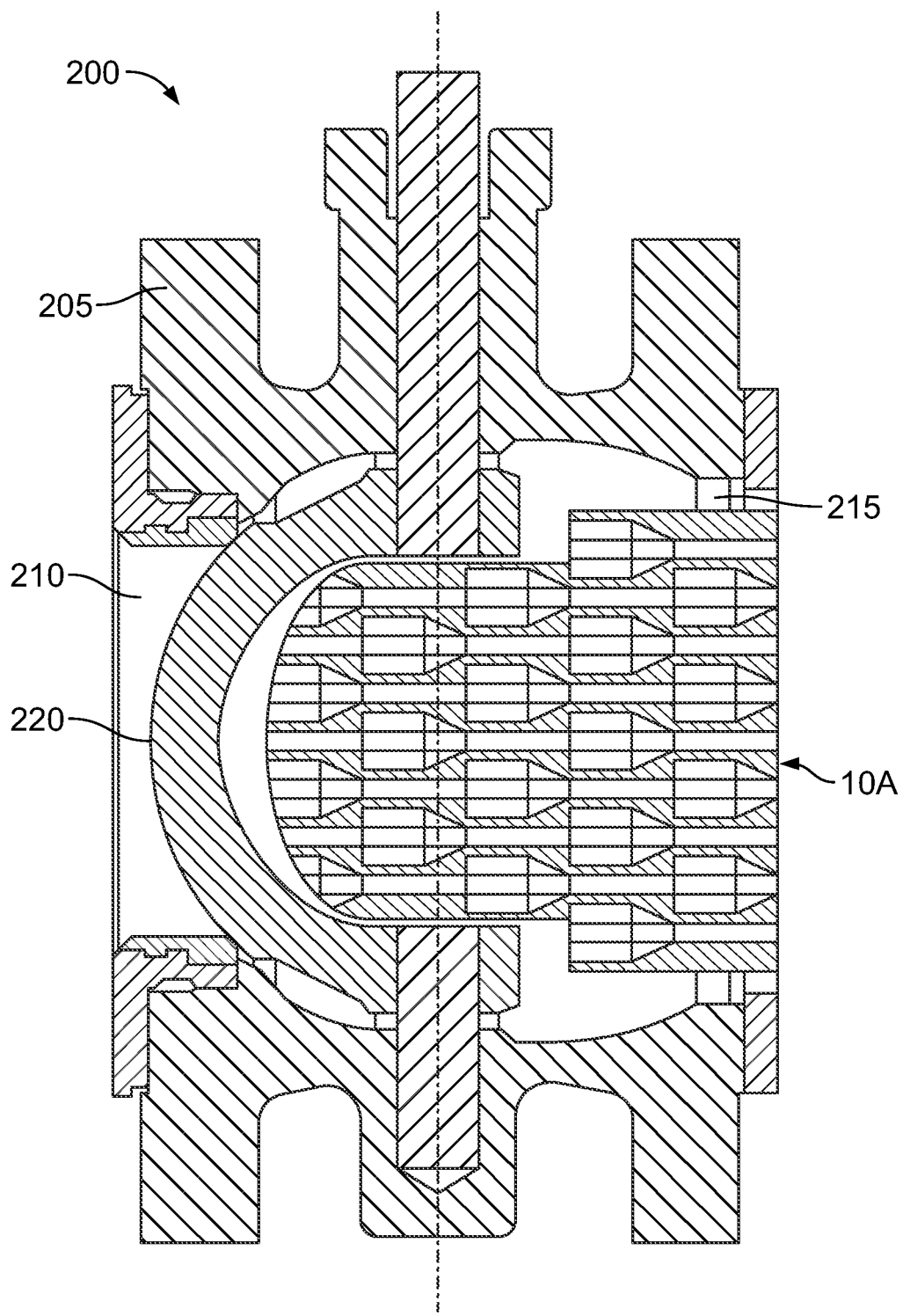
FIG. 6 is a cross-sectional view of an example ball valve with the valve trim of FIG. 4.

Referring to FIG. 6, an example ball valve 200 is shown that that includes valve trim 10A. Ball valve 200 has a valve body 205 having an inlet 210 and an outlet 215. A valve plug 220 is positioned within valve body 205, between inlet 210 and outlet 215, and is rotatable within valve body 205 between an open position, in which valve plug 220 allows fluid flow between inlet 210 and outlet 215, and a closed position, in which valve plug 220 prevents fluid flow between inlet 210 and outlet 215. First section 90 of valve trim 10A is positioned and secured within outlet 215 of valve body 205 and second section 95 extends from first section 90 and into valve plug 220.

Figure 7:
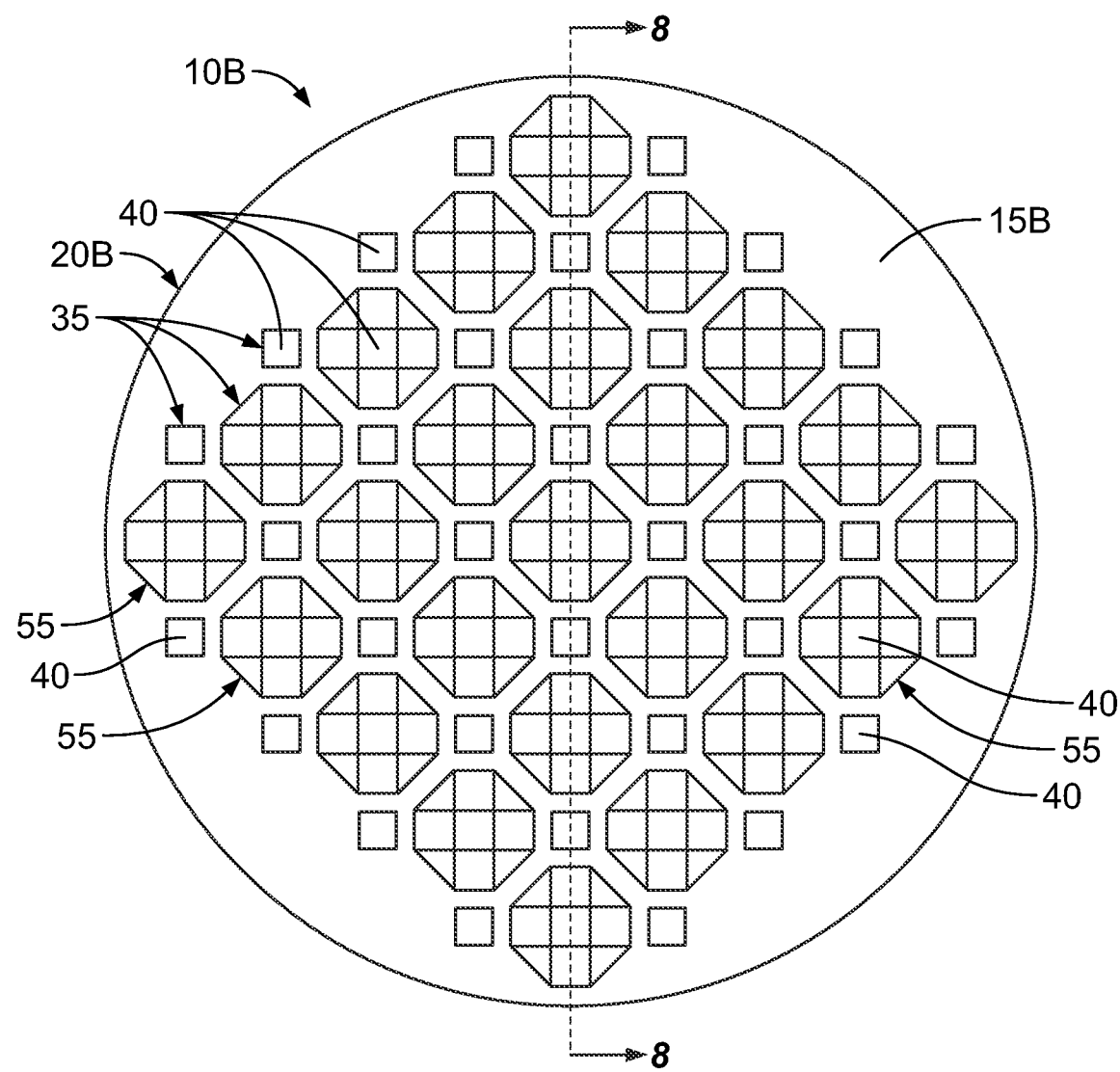
FIG. 7 is a front view of a third example valve trim.
Figure 8:
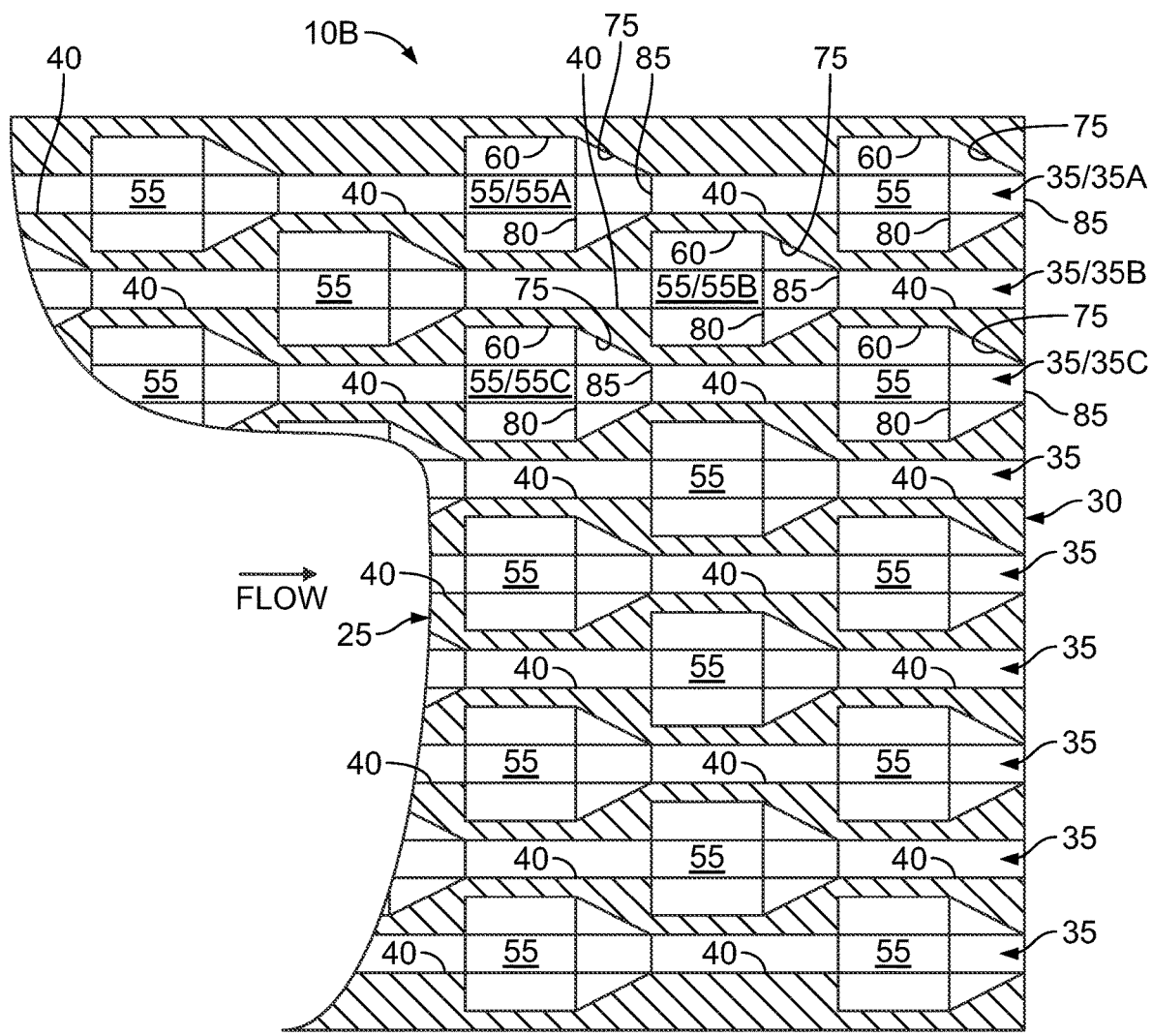
FIG. 8 is a cross-sectional view of the valve trim of FIG. 7 taken along line 8-8 in FIG. 7.

Referring to FIGS. 7-8, a third example valve trim 10B is shown, that can be used with butterfly or ball valves. Valve trim 10B is the same as valve trim 10 described above, except that body 15B of valve trim 10B has a cylindrical outer peripheral shape 20B that allows valve trim 10B to be positioned and secured within an outlet of a butterfly or ball valve, downstream from the valve disc or valve plug. When used in a butterfly valve, first end 25 of body 15B of valve trim 10B can have a concave, arcuate shape that corresponds to the outer surface of the valve disc as it rotates from the closed to the open position. Body 15b of valve trim 10B is preferably a single, unitary piece and can be manufactured using Additive Manufacturing Technology, such as direct metal laser sintering, full melt powder bed fusion, etc., as described above.

As with valve trim 10, flow passages 35 extend through body 15B of valve trim 10B from first end 25 of body 15B to second end 30, opposite first end 25, and can be used to characterize and/or condition fluid flowing through valve trim 10B, for example, by reducing the pressure of the fluid as it flows through flow passages 35. Flow passages 35 are preferably parallel and each flow passage 35 includes at least one throat 40 and at least one expansion chamber 55 in fluid communication with throat 40. As can be seen in FIG. 8, in the example shown, each flow passage 35 can include any number of alternating throats 40 and expansion chambers 55, depending on the position of each flow passage 35 in valve trim 10B. Each throat 40 has a square cross-sectional shape that is constant along the length of throat 40 in the direction of flow, shown by the arrow in FIG. 8. Each expansion chamber 55 has a first section 60 with an octagonal cross-sectional shape that is constant along the length of first section 60 in the direction of flow and a second section 75 that has the octagonal cross-sectional shape of first section 60 at a first end 80 and tapers to the square cross-sectional shape of throat 40 at a second end 85. Each expansion chamber 55 is offset in the direction of flow from the expansion chambers 55 of directly adjacent flow passages 35, as described above. The preferred square, octagonal, and tapered shapes of the throats 40 and expansion chambers 55 and the offset positioning of expansion chambers 55 of flow passages 35 allow expansion chambers 55 to be positioned directly adjacent the throats 40 of directly adjacent flow passages 35 in a direction perpendicular to the direction of flow and each throat 40 to be nested between expansion chambers 55 of directly adjacent flow passages 35. This staggering of expansion chambers 55, nesting of throats 40 between expansion chambers 55, and complimentary shapes of throats 40 and expansion chambers 55 allow a greater number of flow passages 35 to be formed through body 15B of valve trim 10B, which maximizes the flow area through valve trim 10B while maintaining multi-stage cavitation control and noise reduction.

Figure 9:
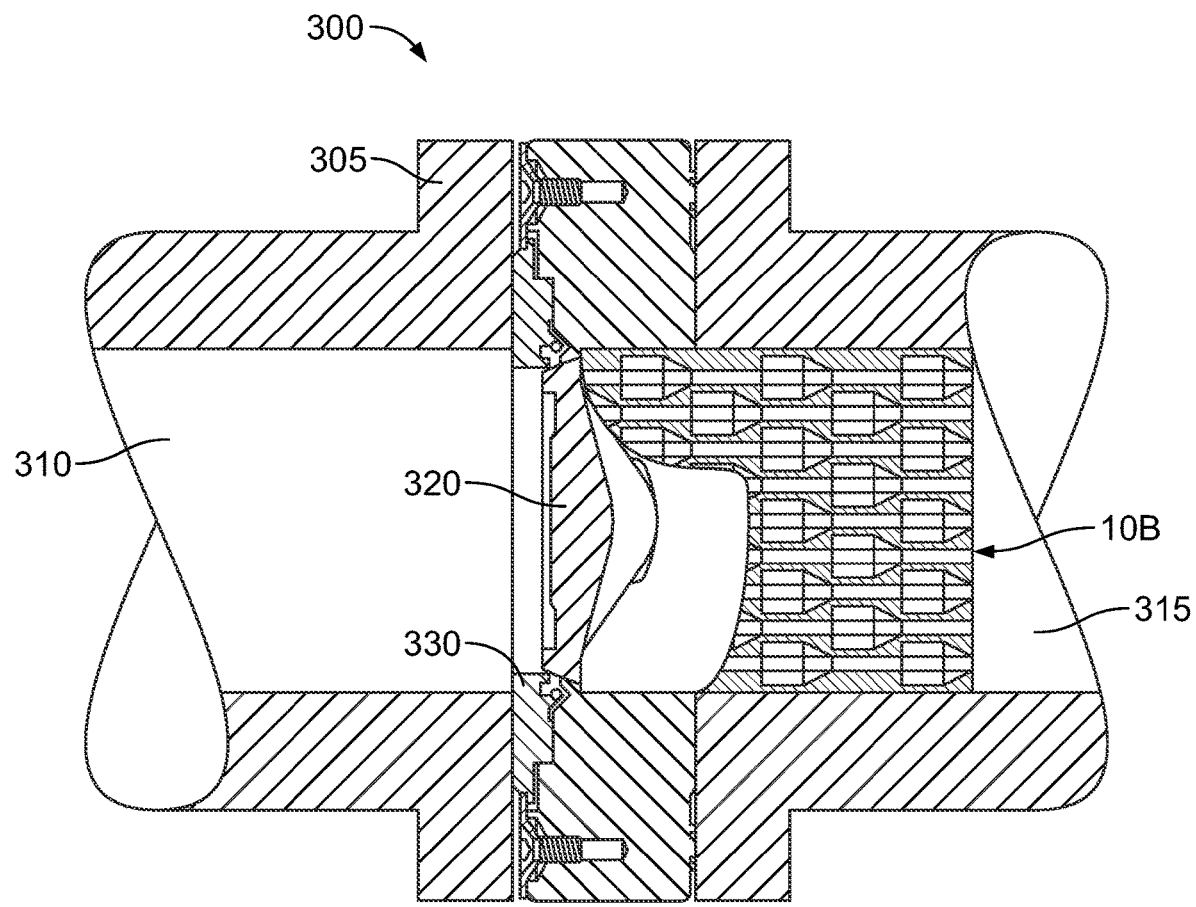
FIG. 9 is a cross-sectional view of an example butterfly valve with the valve trim of FIG. 7.

Referring to FIG. 9, an example butterfly valve 300 is shown that that includes valve trim 10B. Butterfly valve 300 has a valve body 305 having an inlet 310 and an outlet 315. A valve disc 320 is positioned within valve body 305, between inlet 310 and outlet 315, and is rotatable within valve body 305 between a closed position, in which valve disc 320 engages a valve seat 330 and prevents fluid flow between inlet 310 and outlet 315, and an opened position, in which valve disc 320 is spaced apart from valve seat 330 and allows fluid flow between inlet 310 and outlet 315. Valve trim 10B is positioned and secured within outlet 315 of valve body 305, downstream from valve disc 320 and first end 25 of valve trim 10B has a concave, arcuate shape that corresponds to outer surface 325 of valve disc 320 as it rotates from the closed to the open position.

Figure 10A:
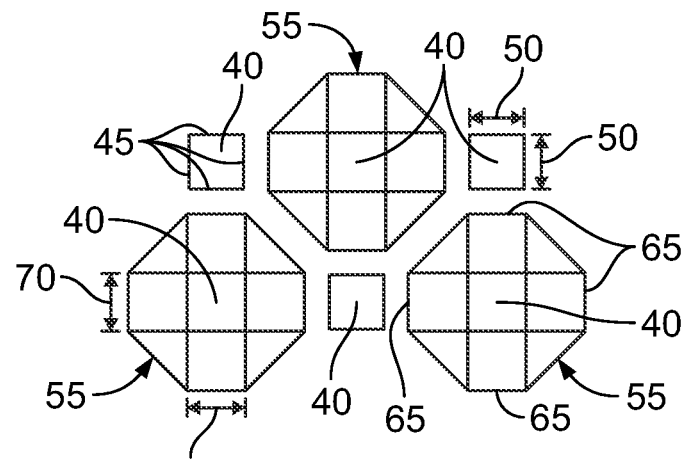
FIGS. 10A-C are examples of different sizes of throats and expansion chambers that can be used in the example valve trims of FIGS. 1, 4, and 7.
Figure 10B:
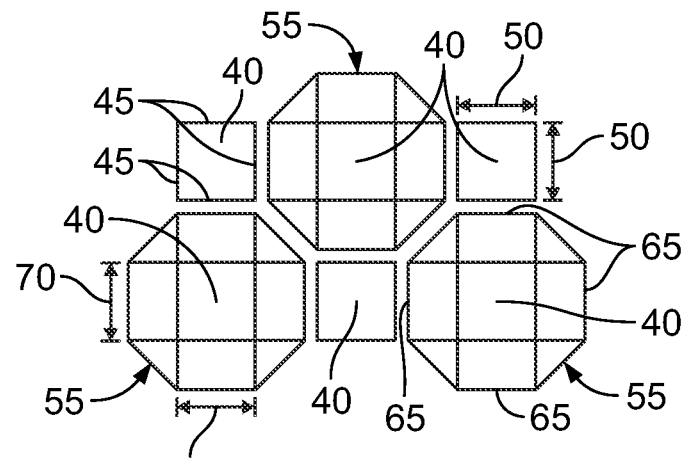
Figure 10C:
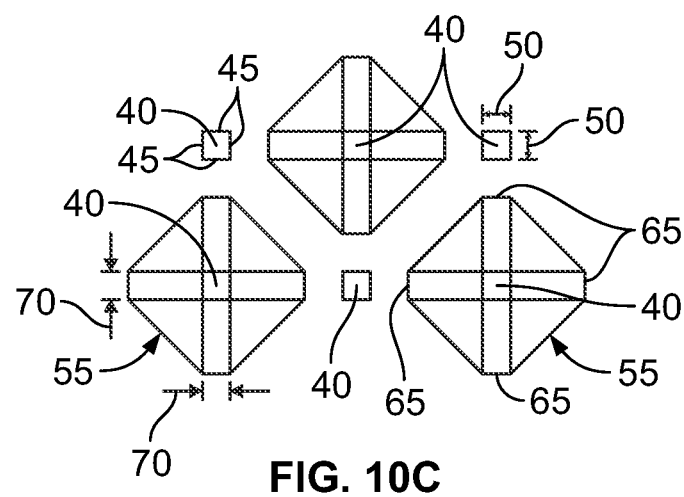

In all of the example valve trims 10, 10A, 10B, each throat 40 has four sides 45, each side 45 having an equal first length 50. In addition, each first section 60 of each expansion chamber 55 has four sides 65 that correspond to and are parallel to each of the sides 45 of respective, adjacent throats 40, each side 65 having a second length 70 that is the same as first length 50 of sides 45 of throats 40. Referring to FIGS. 10A-C, different variations in the first and second lengths 50, 70 of sides 45, 65, of throats 40 and expansion chambers 55 are shown. These variations in first and second lengths 50, 70 still allow flow passages 35 to be nested as described above to maximize flow area through valve trims 10, 10A, 10B, while also allowing control of the cavitation and noise reduction through adjustment of the amount of pressure drop through flow passages 35. For example, first and second lengths 50, 70 in the example shown in FIG. 10B are greater than first and second lengths 50, 70 in the example shown in FIG. 10A. Therefore, in the example shown in FIG. 10B, the difference in the cross-sectional areas of throats 40 and expansion chambers 55 is less than that in the example shown in FIG. 10A and there will not be as great a pressure drop as fluid flows through flow passages 35 having the greater lengths 50, 70 shown in FIG. 10B. Conversely, first and second lengths 50, 70 in the example shown in FIG. 10C are less than first and second lengths 50, 70 in the example shown in FIG. 10A. Therefore, in the example shown in FIG. 10C, the difference in the cross-sectional areas of throats 40 and expansion chambers 55 is greater than in the example shown in FIG. 10A and there will be a greater pressure drop as fluid flows through flow passages 35 having the smaller lengths 50, 70 shown in FIG. 10C. Therefore, the lengths 50, 70 can be adjusted to meet any desired pressure drop through flow passages 35 for a particular application.

While various embodiments have been described above, this disclosure is not intended to be limited thereto. Variations can be made to the disclosed embodiments that are still within the scope of the appended claims.

What is claimed is:

1. A valve trim, comprising:
a body having a plurality of parallel flow passages extending from a first end of the body to a second end of the body, opposite the first end; wherein
each flow passage includes a throat and an expansion chamber adjacent the throat longitudinally along a direction of flow; and
wherein each throat is nested between the expansion chambers of directly adjacent flow passages; and
further wherein each throat has a constant square cross-sectional shape and each expansion chamber has a first section having a constant octagonal cross-sectional shape.

2. The valve trim of claim 1, wherein each expansion chamber is offset in the direction of flow from the expansion chambers of directly adjacent flow passages such that each expansion chamber is directly adjacent the throats of directly adjacent flow passages in a direction perpendicular to the direction of flow.

3. The valve trim of claim 1, wherein the body is a single, unitary piece.

4. The valve trim of claim 1, wherein each expansion chamber has a second section having the octagonal cross-sectional shape of the first section at a first end of the second section and tapers to the square cross-sectional shape of the throat at a second end of the second section.

5. The valve trim of claim 1, wherein:
each throat has four sides, each having a first length; and
each first section of each expansion chamber includes four sides that are parallel to each of the sides of the respective throat and have a second length that is the same the first length.

6. A ball valve including the valve trim of claim 1, the ball valve comprising:
a valve body having an inlet and an outlet; and
a valve plug positioned within the valve body and rotatable between an open position and a closed position; wherein
the valve trim is positioned within the valve plug and rotates with the valve plug.

7. A ball valve including the valve trim of claim 1, the ball valve comprising:
a valve body having an inlet and an outlet; and
a valve plug positioned within the valve body and rotatable between an open position and a closed position; wherein
the valve trim has a first section positioned in the outlet and a second section that extends from the first section and into the valve plug.

8. A butterfly valve including a valve trim, comprising:
the valve trim including:
a body having a plurality of parallel flow passages extending from a first end of the body to a second end of the body, opposite the first end; wherein
each flow passage includes a throat and an expansion chamber adjacent the throat longitudinally along a direction of flow; and
each throat is nested between the expansion chambers of directly adjacent flow passages; and
the butterfly valve including:
a valve body having an inlet and an outlet; and
a valve disc positioned within the valve body and rotatable between a closed position, in which the valve disc engages a valve seat and prevents fluid flow between the inlet and the outlet, and an opened position, in which the valve disc is spaced apart from the valve seat and allows fluid flow between the inlet and the outlet;
wherein the valve trim is positioned within the outlet, downstream from the valve disc; and
further wherein the first end of the valve trim has a concave, arcuate shape that corresponds to an outer surface of the valve disc.

9. A valve trim, comprising:
a body having a plurality of parallel flow passages extending from a first end of the body to a second end of the body, opposite the first end; wherein
each flow passage includes a throat and an expansion chamber; and
each throat has a constant square cross-sectional shape and each expansion chamber has a first section having a constant octagonal cross-sectional shape.

10. The valve trim of claim 9, wherein the body is a single, unitary piece.

11. The valve trim of claim 9, wherein each expansion chamber has a second section having the octagonal cross-sectional shape of the first section at a first end of the second section and tapers to the square cross-sectional shape of the throat at a second end of the second section.

12. The valve trim of claim 11, wherein each throat is nested between the expansion chambers of directly adjacent flow passages.

13. The valve trim of claim 12, wherein each expansion chamber is offset in a direction of flow from the expansion chambers of directly adjacent flow passages such that each expansion chamber is directly adjacent the throats of directly adjacent flow passages in a direction perpendicular to the direction of flow.

14. The valve trim of claim 9, wherein:
each throat has four sides, each having a first length; and
each first section of each expansion chamber includes four sides that are parallel to each of the sides of the respective throat and have a second length that is the same the first length.

15. A ball valve including the valve trim of claim 9, the ball valve comprising:
a valve body having an inlet and an outlet; and
a valve plug positioned within the valve body and rotatable between an open position and a closed position; wherein
the valve trim is positioned within the valve plug and rotates with the valve plug.

16. A ball valve including the valve trim of claim 9, the ball valve comprising:
a valve body having an inlet and an outlet; and
a valve plug positioned within the valve body and rotatable between an open position and a closed position; wherein
the valve trim has a first section positioned in the outlet and a second section that extends from the first section and into the valve plug.

17. A butterfly valve including the valve trim of claim 9, the butterfly valve comprising:
a valve body having an inlet and an outlet; and
a valve disc positioned within the valve body and rotatable between a closed position, in which the valve disc engages a valve seat and prevent fluid flow between the inlet and the outlet, and an opened position, in which the valve disc is spaced apart from the valve seat and allows fluid flow between the inlet and the outlet; wherein
the valve trim is positioned within the outlet, downstream from the valve disc.

18. The butterfly valve of claim 17, wherein the first end of the valve trim has a concave, arcuate shape that corresponds to an outer surface of the valve disc.

* * * * *

UNITED STATES PATENT AND TRADEMARK OFFICE
CERTIFICATE OF CORRECTION

PATENT NO. : 11,624,455 B2
APPLICATION NO. : 17/097551
DATED : April 11, 2023
INVENTOR(S) : Jason D. Jablonski It is certified that error appears in the above-identified patent and that said Letters Patent is hereby corrected as shown below:

In the Specification

At Column 2, Line 14, "same the" should be -- same as the --.

At Column 3, Line 26, "same the" should be -- same as the --.

At Column 5, Line 61, "that that" should be -- that --.

At Column 6, Line 60, "that that" should be -- that --.

At Column 7, Line 58, "that that" should be -- that --.

In the Claims

At Column 9, Lines 7-8, "same the" should be -- same as the --.

At Column 10, Lines 22-23, "same the" should be -- same as the --.

Signed and Sealed this
Sixth Day of February, 2024

Katherine Kelly Vidal
*Director of the United States Patent and Trademark Office*